US011358338B2

(12) United States Patent
Weichselbaumer et al.

(10) Patent No.: US 11,358,338 B2
(45) Date of Patent: Jun. 14, 2022

(54) GENERATIVE LAYER CONSTRUCTION METHOD HAVING IMPROVED DETAIL RESOLUTION, AND DEVICE FOR CARRYING OUT THE SAME

(71) Applicant: EOS GMBH ELECTRO OPTICAL SYSTEMS, Krailling (DE)

(72) Inventors: Andrea Weichselbaumer, Pfaffenhofen (DE); Michael Jan Galba, Puchheim (DE)

(73) Assignee: EOS GmbH Electro Optical Systems, Krailling (DE)

( * ) Notice: Subject to any disclaimer, the term of this patent is extended or adjusted under 35 U.S.C. 154(b) by 828 days.

(21) Appl. No.: 16/082,810

(22) PCT Filed: Feb. 24, 2017

(86) PCT No.: PCT/EP2017/054406
§ 371 (c)(1),
(2) Date: Sep. 6, 2018

(87) PCT Pub. No.: WO2017/153187
PCT Pub. Date: Sep. 14, 2017

(65) Prior Publication Data
US 2019/0091935 A1   Mar. 28, 2019

(30) Foreign Application Priority Data
Mar. 10, 2016 (DE) .......................... 102016203955.5

(51) Int. Cl.
*B29C 64/393* (2017.01)
*B29C 64/153* (2017.01)
(Continued)

(52) U.S. Cl.
CPC ............ *B29C 64/393* (2017.08); *B22F 10/20* (2021.01); *B28B 1/001* (2013.01);
(Continued)

(58) Field of Classification Search
CPC ... B29C 64/393; B29C 64/386; B29C 64/165; B29C 64/20; B29C 64/10; B29C 64/153;
(Continued)

(56) References Cited

U.S. PATENT DOCUMENTS 5,597,520 A    1/1997  Smalley et al.
7,718,933 B2 * 5/2010  Huskamp ............... B33Y 30/00
                                              219/494
(Continued)

FOREIGN PATENT DOCUMENTS

DE    102012022435     5/2014
WO     1995011100     4/1995
(Continued)

OTHER PUBLICATIONS

International Search Report for Application No. PCT/EP2017/054406 dated Jul. 6, 2017, 6 pages.

*Primary Examiner* — Joseph S Del Sole
*Assistant Examiner* — Baileigh Kate Darnell
(74) *Attorney, Agent, or Firm* — Seyfarth Shaw LLP

(57) ABSTRACT

A method is disclosed and includes providing a first data set marking an object cross-section, determining whether the length of a connecting line undercuts a specified minimum dimension, generating a second data such that, in the event falling the minimum dimension is undercut, a position lying within an object cross-section on the connecting line is marked as a position not to be solidified or to which a reduced radiation to be supplied, and for a position lying outside of the object cross-section, positions of an object cross-section directly above or below that are adjacent to this position are marked as positions not to be solidified or to which a reduced radiation is to be supplied, and integrating the second data set into the control command set.

15 Claims, 5 Drawing Sheets

(51) Int. Cl.
  *B29C 64/20* (2017.01)
  *B33Y 10/00* (2015.01)
  *B33Y 50/02* (2015.01)
  *B29C 64/386* (2017.01)
  *B29C 64/165* (2017.01)
  *B22F 10/20* (2021.01)
  *B33Y 30/00* (2015.01)
  *B28B 1/00* (2006.01)
  *B28B 17/00* (2006.01)
  *B22F 10/30* (2021.01)

(52) U.S. Cl.
  CPC ........ *B28B 17/0081* (2013.01); *B29C 64/153* (2017.08); *B29C 64/165* (2017.08); *B29C 64/20* (2017.08); *B29C 64/386* (2017.08); *B33Y 10/00* (2014.12); *B33Y 30/00* (2014.12); *B33Y 50/02* (2014.12); *B22F 10/30* (2021.01); *Y02P 10/25* (2015.11)

(58) Field of Classification Search
  CPC ......... B33Y 10/00; B33Y 30/00; B33Y 50/02; B28B 1/001; B28B 17/0081; B22F 10/20; B22F 10/30
  See application file for complete search history.

(56) References Cited

U.S. PATENT DOCUMENTS

| 9,789,541 | B2* | 10/2017 | Fager | B29C 64/386 |
| 10,668,662 | B2* | 6/2020 | Valero Navazo | B29C 64/393 |
| 2003/0074174 | A1* | 4/2003 | Fu | H04R 25/658 703/13 |
| 2010/0007062 | A1 | 1/2010 | Larsson et al. | |
| 2014/0332507 | A1 | 11/2014 | Fockele | |
| 2015/0086409 | A1* | 3/2015 | Hellestam | B33Y 10/00 419/55 |
| 2015/0174658 | A1* | 6/2015 | Ljungblad | B22F 12/00 419/55 |
| 2015/0174695 | A1 | 6/2015 | Elfstroem et al. | |
| 2016/0167131 | A1 | 6/2016 | Weilhammer et al. | |
| 2016/0167160 | A1* | 6/2016 | Hellestam | B28B 1/001 419/7 |
| 2016/0332374 | A1* | 11/2016 | Nauka | B29C 64/393 |
| 2016/0332379 | A1 | 11/2016 | Paternoster et al. | |
| 2017/0173880 | A1* | 6/2017 | Desimone | B29C 64/171 |

FOREIGN PATENT DOCUMENTS

| WO | 2013079581 | 6/2013 |
| WO | 2015000854 | 1/2015 |
| WO | 2015114035 | 8/2015 |

\* cited by examiner

Prior Art

GENERATIVE LAYER CONSTRUCTION METHOD HAVING IMPROVED DETAIL RESOLUTION, AND DEVICE FOR CARRYING OUT THE SAME

TECHNICAL FIELD OF THE INVENTION

The present invention relates to a method of building up three-dimensional objects layer-by-layer by means of a generative manufacturing, and a corresponding device. In particular, the present invention relates to such a method and such a device by which the detail resolution of the manufactured objects is improved.

BACKGROUND OF THE INVENTION

WO 95/11100 A1 describes a laser sintering method as a special case of a generative layer manufacturing method. The manufacturing process typically runs in such a manner that a CAD model of an object to be manufactured is prepared, sliced into layers and, subsequently, the building material is solidified layer by layer corresponding to cross-sections of the CAD model.

In WO 95/11100 A1, for solidifying the building material in powder form, laser radiation is directed to the powder layer, whereby the building material melts at the point of incidence of the radiation and then exists as a solid body after a cooling down. In the method, the extension of the melted region and the degree of melting, i.e. the dimensions of the melt pool thus generated, can vary from position to position due to the different heat dissipation capability of the environment at the corresponding positions. Thus, for instance, non-solidified building material powder conducts heat worse than already solidified regions of the object to be manufactured.

WO 2013/079581 A1 describes a method of manufacturing molds from metal or ceramic powder, wherein the temperature at the irradiation position and thus the melting conditions can be made more homogeneous within a building material layer. To this end, the local application of energy per unit time at an irradiation position is selected depending on the pre-calculated heat dissipation capability of a defined three-dimensional region directly surrounding the irradiation position.

When manufacturing filigree structures, the method described in WO 2013/079581 A1 is only applicable with restrictions since the local environment to be defined around a point of incidence of the radiation needs to be selected such as to be extremely small in order to reflect the conditions during the manufacturing process. Furthermore, the inventors have found that, particularly for a small extension of an object detail perpendicularly to the building material layers, it is only to a limited extent possible to realize the targeted construction part dimensions true to detail with the approaches known in the state of the art, as shall be described on the basis of FIGS. 4a and 4b.

FIG. 4a shows several building material layers 400 stacked on top of each other and extending horizontally. The reference sign 401 designates the contour of a cross-section extending perpendicularly to the layers 400 of a cylinder extending in parallel to the layers 400 (perpendicularly to the plane of the image) and having a circular cross-section. In the course of this, the contour 401 is an intended contour of the cylinder specified in the original CAD model. FIG. 4a shows by reference sign 404 the contour of a cross-section of the cylinder which is then actually manufactured in a generative layer manufacturing method. As one can see, the initially targeted cross-section is bulging downwards as well as upwards. The reason for this lies in the insufficient heat dissipation capability of the powder outside the cross-section to be solidified. Such powder is also heated as a consequence of the heat accumulation due to the insufficient heat dissipation capability to such an extent that it partially melts and thereby leads to an enlargement of the cylinder cross-section, which is correspondingly realized such as to be oval and not circular.

A similar problem occurs when, as shown in FIG. 4b, a channel extending in parallel to the building material layers 400 and having a circular cross-section 403 needs to be realized. As one can see in FIG. 4b, the actual solidified region indicated by means of hatching is enlarged, so that eventually only a channel having an oval cross-section 404 can be realized. Again, the insufficient heat dissipation capability of the non-solidified powder within the channel to be realized leads to a partial melting of the same.

In the case of a small extension of object sections parallel to the layers, a further problem is added by an additional undesired growing of the object sections parallel to the layers (not depicted) due to the insufficient heat dissipation capability of the non-solidified powder.

SUMMARY OF THE INVENTION

In the light of the described problems, it is an object of the present invention to provide a method for making possible a manufacturing of filigree objects with a good detail resolution as well as a corresponding device.

The object is solved by a method according to claim 1, a method according to claim 11, a generative layer manufacturing device according to claim 12, a control device according to claim 14, and a computer program according to claim 15. Further developments of the invention are described in the dependent claims. In the course of this, features mentioned in the dependent claims or, respectively, in the following description in connection with one claim category may also be used for a further development of subject matters of any other claim category, unless this is explicitly ruled out.

A method according to the invention for providing a control command set for manufacturing at least one three-dimensional object by means of a generative layer manufacturing device, wherein the at least one object is manufactured in the generative layer manufacturing device layer by layer by solidifying a shapeless, i.e. in powder form or liquid, building material at the positions corresponding to the cross-section of an object in a layer by supplying energy radiation or a binding agent to these positions, comprises at least the following steps:

providing a first data set in which, for each of several building material layers to be selectively solidified during a generative layer manufacturing process and lying directly above one another, positions corresponding to an object cross-section are marked, at which positions a solidification of the building material shall take place, determining whether, in a layer, the length of a connecting line extending between edges of one or more object cross-sections and being parallel to the layer undercuts a predetermined minimum dimension, generating a second data set which differs from the first data set in that, when an undercut of the minimum dimension has been determined for a layer, a layer position lying within an object cross-section on a connecting line between its edges whose length undercuts the minimum dimension is marked as a position not to be solidified or as a position to which a reduced radiation energy amount or a reduced binding agent amount is to be supplied in comparison to other positions in the layer, and/or for a layer position lying outside of an object cross-section on a connecting line between edges whose length undercuts the minimum dimension, positions of an object cross-section in the layer directly above and/or below which are adjacent to this position are marked as positions not to be solidified or as positions to which a reduced radiation energy amount or a reduced binding agent amount is to be supplied, integrating the second data set into the control command set for manufacturing the at least one three-dimensional object by means of the generative layer manufacturing device.

By the method according to the invention, it is possible to manufacture filigree sections of an object having a small extension perpendicularly to the layers of the building material with a good detail reproduction by means of a generative layer manufacturing method on the basis of the (thus modified) control command set. In particular, for achieving a higher detail accuracy, it is not necessary to reduce the layer thickness of the building material layers or, as the case may be, to reduce the diameter of an energy beam or binding agent beam moved across a layer for solidifying the building material. Both would lead to a significantly longer manufacturing time of an object.

The method according to the invention can be performed in preparation of a manufacturing process for the at least one object, i.e. before starting such a manufacturing process, and/or it can also be carried out during, i.e. in the process, of such a manufacturing process. In the latter case, for instance, also measurement values from the manufacturing process generated during the manufacturing can (additionally) be taken into account.

The generative layer manufacturing device may, for instance, be a selective laser sintering or melting device. Beside that, the inventors have found out that the procedure according to the invention also offers advantages in connection with stereolithography devices and 3D printing devices:

In a 3D printing device, a building material in powder form is selectively solidified by applying a binding agent (e.g. an adhesive) at positions to be solidified. However, in the course of this, the binding agent locally applied can also partially get into the material surrounding the position of powder to be solidified, or the induced reactions in the material can also spread to the surrounding area and effect at least a partial solidification in the latter. Thus, also in this case the deviations of the shape of the manufactured object from the desired shape shown in FIGS. 4a and 4b can result.

In a stereolithography device, a solidification is effected by a selective irradiation of a photopolymer layer with radiation (in particular, UV radiation). In the course of this, the solidification takes place by radiation-induced cross-linking processes, without a melting of the photopolymer, which usually is already in a liquid state. However, when the photopolymer is being irradiated with radiation, it may happen that radiation also reaches to some extent regions of material surrounding a position to be irradiated or that the induced reactions in the material also spread to the surrounding area and, thus, also there an at least partial solidification is effected. Thus, also in this case the deviations of the shape of the manufactured object from the desired shape shown in FIGS. 4a and 4b can result.

The method according to the invention can be particularly advantageously applied in connection with a generative layer manufacturing device in which a building material in powder form is used and the solidification of the building material is accomplished by means of heat supply to the positions corresponding to the cross-section of an object in a layer by selectively scanning the layer with energy radiation.

In particular, in sintering or melting methods where powder material is melted by means of electromagnetic radiation or particle radiation at least on the surface, the problems described in the introductory part of the description caused by the worse heat sinking capability of the powder can be addressed by the procedure according to the invention.

Preferably, the minimum dimension is specified depending on the thickness of the layer. Hereby, it is possible to purposefully adapt the method to a predetermined generative layer manufacturing method.

Preferably, for a layer position lying outside of an object cross-section on a connecting line between edges whose length undercuts the minimum dimension, in n further layers adjacent to the layer directly above or to the layer directly below, positions lying above or below the layer position are marked as positions not to be solidified or as positions to which a reduced radiation energy amount or a reduced binding agent amount is to be supplied, wherein n is an integer less than 10. In this manner, situations can be addressed in which the non-solidified building material is unintentionally solidified in several layers bordering on a section to be solidified.

Preferably, the method according to the invention is applicable to manufacturing processes in which the at least one object comprises a three-dimensional region in which a three-dimensional lattice of lattice bars is present, wherein at least in one layer within a lattice bar it is determined whether an undercut of the minimum dimension (m) occurs and, if this is the case in this layer, all positions lying in this layer within a cross-section through the lattice bar on a connecting line between edges of the cross-section whose length undercuts the minimum dimension m are marked as positions not to be solidified.

Even though the method according to the invention is applicable to arbitrary filigree sections of objects to be manufactured, it yields particular advantages specifically when manufacturing lattice bars provided in an object. Such lattice bars can be components of the object to be manufactured itself, such as e.g. an internal lattice structure. However, the lattice bars can also be elements of a support structure for the object to be manufactured.

It is further preferred that the method according to the invention is also applicable to manufacturing processes in which the at least one object comprises a channel extending not perpendicularly to the layers, wherein at least in one layer within the channel it is determined whether an undercut of the minimum dimension m occurs and, if this is the case in this layer, for all positions lying in this layer within the channel on a connecting line between edges of the channel in this layer whose length undercuts the minimum dimension m, positions of an object cross-section in the layer directly above and/or below adjacent to these positions are marked as positions not to be solidified. Namely, in particular filigree channels within an object can often be only insufficiently realized with the desired detail accuracy by the known methods.

Further, the method according to the invention is also applicable to manufacturing processes in which the at least one object comprises at least one taper, e.g. a tip, protruding upwards or downwards at an angle less than 30° to the perpendicular to the layers, wherein at least in one layer it is determined within the taper whether an undercut of the minimum dimension occurs and, if this is the case in this layer, all positions lying in this layer within a cross-section through the taper on a connecting line between edges of the taper whose length undercuts the minimum dimension are marked as positions not to be solidified.

Besides, the method according to the invention is also applicable to manufacturing processes in which the at least one object comprises at least one blind hole protruding and narrowing upwards and/or downwards at an angle less than 30° to the perpendicular to the layers, wherein at least in one layer within the blind hole it is determined whether an undercut of the minimum dimension occurs and, if this is the case in this layer, for all positions lying in this layer within a cross-section through the blind hole on a connecting line between edges of the blind hole whose length undercuts the minimum dimension, positions of an object cross-section in the layer directly above and/or below adjacent to these positions are marked as positions not to be solidified.

Both preceding method variants make it clear that, apart from bars and channels, still further classes of filigree elements exist to which the method according to the invention is applicable in an advantageous manner. Precisely in the case of a narrowing blind hole or, respectively, a narrowing tip, a manufacturing method will generally reach its limit of detail formation. However, by the present method, the respective limits of detail resolution are shifted towards smaller values.

Preferably, when a building material in powder form is used and the building material is solidified by means of heat supply to the positions corresponding to the cross-section of an object in a layer by selectively scanning the layer with energy radiation, the minimum dimension is specified depending on an expected maximum extension parallel to the powder layer of a melt pool to be generated by the energy radiation.

The minimal area to be solidified in a layer depends not solely on the beam diameter of the radiation introduced for the solidification, but eventually on the diameter of the melt pool generated by the heat introduced into the building material by means of the radiation, wherein the melt pool diameter can deviate from the beam diameter, inter alia when the solidification beam does not hit a layer perpendicularly. Therefore, in this variant of the method according to the invention, it is taken into account that the accuracy of dimensions perpendicularly to the building material layers is affected by the possible detail resolution within a building material layer. For instance, a narrowing tip cannot have a smaller diameter at its end than the melt pool diameter.

In a variant of the method according to the invention, for those positions of an object cross-section in a layer at which a solidification is intended in the layer lying directly below or above, the supply of a smaller radiation energy amount or a smaller binding agent amount is specified than for the other positions to be solidified in the layer. Hereby, for instance, filigree channels within an object can be realized with a still higher detail accuracy.

A method according to the invention for manufacturing at least one three-dimensional object by means of a generative layer manufacturing device controlled by a control command set generated by a method according to the invention, wherein the at least one object is manufactured in the generative layer manufacturing device layer by layer by solidifying a shapeless building material at the positions corresponding to the cross-section of an object in a layer by supplying energy radiation or a binding agent to these positions, comprises at least the following steps:

an application step of providing a layer of a shapeless building material on a building base or an already existing layer of the building material, a solidification step of solidifying the applied layer during which the energy radiation or the binding agent interacts with positions of the layer to be solidified such that, after the interaction, the building material exists as a solid body, wherein the application step and the solidification step are repeated one after another as often as until all cross-sections of the at least one three-dimensional object to be manufactured are solidified.

By means of the method according to the invention for manufacturing at least one three-dimensional object, the true-to-detail realisation of filigree structures is made possible without necessarily prolonging the actual manufacturing process by reducing the layer thicknesses or, as the case may be, reducing the diameter of an energy beam or binding agent beam moved across a layer for solidifying the building material. Thereby, a quicker manufacturing of filigree objects is possible.

A generative layer manufacturing device according to the invention for manufacturing at least one three-dimensional object from a shapeless, i.e. in powder form or liquid, building material layer by layer by solidifying the building material at the positions corresponding to the cross-section of an object in a layer by supplying energy radiation or a binding agent to these positions, comprises:

a building base for carrying the object to be built up, an application device for applying a layer of the building material onto the surface of the building base or an already existing layer, a solidification device emitting energy radiation or discharging a binding agent and being capable of supplying the energy radiation or the binding agent to all positions to be solidified in a layer such that the building material at these positions exists as a solid body after being affected by the energy radiation or the binding agent, and a control device controlling the application device and the solidification device such that an application step and a solidification step are repeated one after another until all cross-sections of the at least one three-dimensional object to be manufactured are solidified, wherein the control device is configured such that it performs a method according to the invention for providing a control command set or, respectively, for manufacturing at least one three-dimensional object.

The generative layer manufacturing device according to the invention is in a particular manner configured to realize filigree sections of an object to be manufactured with a particularly high detail accuracy.

In a variant of the generative layer manufacturing device according to the invention in which a building material in powder form can be used and the solidification device is an irradiation device emitting electromagnetic radiation or particle radiation, wherein the irradiation device is capable of irradiating all positions to be solidified in a layer such that the powder grains at these positions are partially or completely melted by the heat energy supplied by the radiation, so that, after a cooling down, they are interconnected forming a solid body and, additionally, a melt pool monitoring unit is provided which is able of providing sensory, in particular optical, information about a melt pool at a point of incidence of the radiation of the irradiation device onto a layer of the building material in powder form, wherein the generative layer manufacturing device is configured to use a sensory (in particular optical) information about the melt pool by the control device for specifying the minimum dimension.

This variant of the generative layer manufacturing device according to the invention is configured to capture an optical information about a melt pool during the manufacturing process. Thereby, the length of a minimum dimension, which is an important parameter for improving the detail accuracy, can be dynamically adapted to changing process conditions during the manufacturing method. This is, of course, only possible if, at the same time, also the control command set can be changed during the manufacturing of objects.

A control device according to the invention for equipping and/or retrofitting a generative layer manufacturing device is configured such that it performs a method according to the invention for providing a control command set or, respectively, for manufacturing at least one three-dimensional object. A computer program according to the invention loadable into a programmable control device and/or data processing device comprises program code means in order to perform all steps of a method according to the invention for providing a control command set or, respectively, for manufacturing at least one three-dimensional object when the computer program is executed in the control device and/or the data processing device.

Advantageously, a control device according to the invention is realizable separately from a generative layer manufacturing device. Thereby, a retrofitting of existing generative layer manufacturing devices is possible in such a manner that their detail accuracy during the manufacturing of objects is raised.

The computer program according to the invention can be retrofitted in existing generative layer manufacturing devices in a similar manner. Furthermore, it is possible to execute the computer program according to the invention in a data processing system spatially separate from the generative layer manufacturing device, for instance, in a CAD draft system for designing objects to be manufactured. Further, the computer program according to the invention can also be executed outside the environment of a generative layer manufacturing device, which is often provided with specific climatic conditions. Thus, thereby it is not necessary for an operator to carry protective clothing possibly prescribed in the environment of the generative layer manufacturing device.

BRIEF DESCRIPTION OF THE DRAWINGS

In the following, the invention will be described with the aid of the drawings. The figures show.

DETAILED DESCRIPTION OF THE EMBODIMENTS

Figure 1:
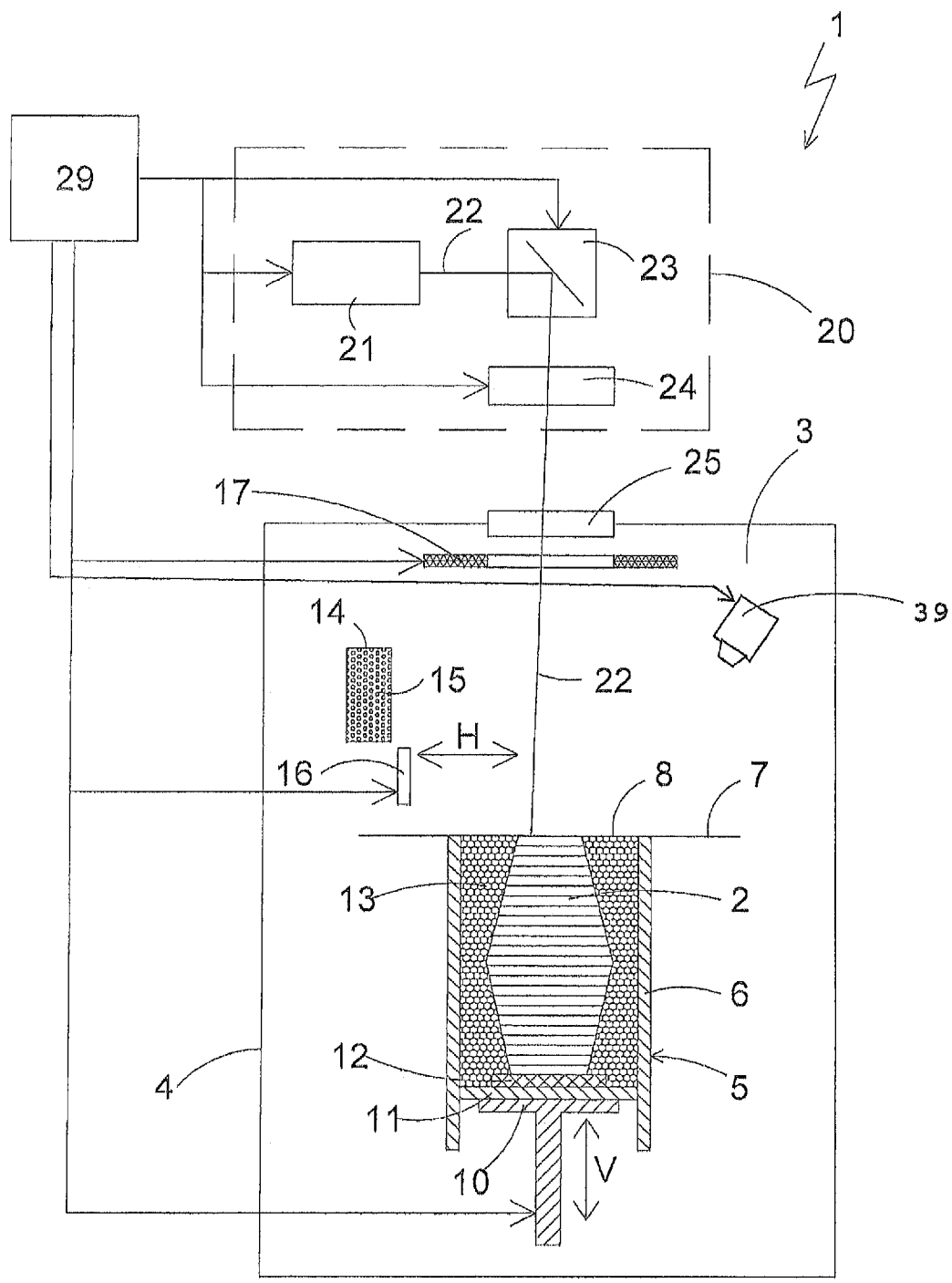
FIG. 1 an example of a device for a layer-by-layer manufacturing of three-dimensional objects from a powder material according to an example of an embodiment of the invention, FIG. 2 a cross-section perpendicularly to the building material layers through a cylindrical section of an object to be manufactured, FIG. 3 a cross-section perpendicularly to the building material layers through an object to be manufactured having a channel, FIG. 4a a cross-section transversely to the layers of the building material of a cylindrical object section for explaining the problem of the state of the art, and FIG. 4b a cross-section transversely to the layers through an object section having a channel for explaining a problem of the state of the art.

In the following, first, a laser sintering or melting device 1 will be described referring to FIG. 1 as an example of a generative layer manufacturing device by means of which the method according to the invention for manufacturing at least one three-dimensional object can be performed. Thus, the device shown is also an example for a generative layer manufacturing device according to the invention.

For building up an object 2, the layer manufacturing device contains a process chamber 3 having a chamber wall 4. In the process chamber 3, a container 5 open to the top and having a container wall 6 is arranged. The vertical position of the upper opening of the container 5 defines a working plane 7, wherein the region of the working plane 7 lying within the opening which can be used for building up the object 2 is denoted as build area 8.

In the container 5, a support 10 movable in a vertical direction V is arranged at which a base plate 11 is mounted that closes the container 5 in a downward direction and thereby forms its bottom. The base plate 11 may be a plate formed separately from the support 10, which is attached to the support 10, or it may be integrally formed with the support 10. Depending on a powder used and a process, a building platform 12 on which the object 2 is built up may further be mounted on the base plate 11. However, the object 2 may also be built up on the base plate 11 itself, which then serves as a building platform. In FIG. 1, the object 2 to be built up in the container 5 on the building platform 12 is shown below the working plane 7 in an intermediate state having several solidified layers surrounded by building material 13 remaining non-solidified.

The laser sintering device 1 further contains a storage container 14 for a building material 15 in powder form which can be solidified by electromagnetic radiation and a recoater 16 movable in a horizontal direction H for applying the building material 15 to the build area 8. Further, a radiation heater 17 serving for heating the building material 15 applied to the build area 8 is optionally arranged in the process chamber 3. The radiation heater 17 is, for instance, formed as an infrared radiator.

The laser sintering device 1 further contains an irradiation device 20 having a laser 21 generating a laser beam 22 deflected via a deflecting device 23 and focused by a focusing device 24 via a coupling window 25, which is mounted at the upper side of the process chamber 3 in the chamber wall 4, onto the working plane 7.

The laser sintering device 1 further contains a control device 29 via which the individual component parts of the device 1 are controlled in a coordinated manner for performing the building process. The control device may also be mounted partially or completely outside the device. The control device may contain a CPU whose operation is controlled by a computer program (software). The computer program may be stored separately from the device on a storage medium, from which it can be loaded into the device, in particular, into the control device.

During operation, for the application of a powder layer at first the support 10 is lowered by a height corresponding to the desired layer thickness. The recoater 16 first moves to the storage container 14 and receives from it an amount of the building material 15 sufficient for applying a layer. Then it moves across the build area 8 and applies there a thin layer of the building material 15 in powder form. The application is carried out at least across the total cross-section of the object 2 to be manufactured, preferably across the whole build area 8, i.e. that region of the working plane 7 below which the support is vertically lowered. Optionally, the building material in powder form is subsequently heated by the radiation heater 17. After a working temperature is reached, the cross-section of the object 2 to be manufactured is scanned by the laser beam 22, so that the building material 15 in powder form is solidified at the positions corresponding to the cross-section of the object 2 to be manufactured. These steps are repeated until the object 2 is completed and can be removed from the process chamber 3.

As building material in powder form, all powders or, respectively, powder mixtures suitable for the laser sintering or, respectively, melting method may be used. Such powders comprise e.g. plastic powders such as polyamide or polystyrene, PAEK (Polyarylene Ether Ketone), elastomers, such as PEBA (Polyether Block Amide), plastic-coated sand, ceramic powders, or metal powders, e.g. stainless steel powders or other metal powders adapted to the respective purpose, in particular, alloys.

In the exemplary generative layer manufacturing device 1 just described, the control device 29 is adapted such that the inventive method for manufacturing at least one three-dimensional object can be performed in the layer manufacturing device.

A manufacturing process for manufacturing at least one three-dimensional object by means of the laser sintering or melting device takes place such that the control device 29 processes a control command set, which represents instructions to apply layers of the building material one after another and to selectively irradiate regions of the respective layer which correspond to the cross-section of an object to be manufactured by the laser radiation. Thus, the control command set contains information about the positions to be solidified within a layer as well as the type of subdividing the object to be manufactured in layers.

In detail, the control command set is based on a computer-based model of the object or objects to be manufactured, preferably, a CAD volume model. Further, also manufacturing-specific information, for instance, the position and orientation of the objects in the container 5, flows into the control command set. Finally, also the layer information is included in the control command set, i.e. in which manner the object or objects to be manufactured are sliced into layers corresponding to the building material layers during the layer-by-layer generative manufacturing. The control command set specifies for each building material layer during the manufacturing in particular the thickness of the layer application and the positions at which a solidification of the building material shall be effected by supply of radiation. In particular, the control command set also includes all data required for the control of the irradiation device 20, whereby, inter alia, the energy density of the radiation 22 emitted by the irradiation device 20 and, as the case may be, the movement velocity of the beam across the build area 8 are specified.

According to the invention, a control command set for a generative layer manufacturing device is adapted for improving the detail accuracy of the manufactured objects. In the course of this, an already provided control command set for the complete manufacturing process of the object or objects can be modified. However, it is also possible that a control command set dynamically generated during the manufacturing process is modified according to the invention. In the case of a dynamically generated control command set, it is possible to specify layer and irradiation parameters not before one or several cross-sections of the object or objects have already been solidified in one or more preceding layers. The present invention is applicable both to the case of the control command set statically provided for the entire manufacturing procedure and to the case of the dynamically generated control command set. Accordingly, a first data set accessed according to the invention need not be a complete control command set, but can also only contain partial information from the same. In order that the method according to the invention can be applied to a layer, the first data set at least has to contain information about the extension of an object cross-section in this layer.

Advantageously, the method according to the invention is performed by means of the control device 29 which then controls the manufacturing process by means of the generative layer manufacturing device on the basis of the control command set modified according to the invention. However, it is also possible to carry out the data modification according to the invention outside of the generative layer manufacturing device, so that the control device 29 is then fed directly with a control command set modified according to the invention. Further, the modification of a first data set according to the invention can also be carried out at another location (in another data processing system) than the generation of a control command set for the generative layer manufacturing process.

The process according to the invention will be exemplarily described in the following by referring to FIGS. 2 and 3.

When the generative layer manufacturing method is carried out, the control device 29, as mentioned, controls the irradiation device 20 such that the laser beam 22 is directed exactly to those positions of the build area 8 at which a solidification shall take place. According to the invention, first, it is checked in a first data set, for instance, a control command data set or a data set containing partial information from a control command data set, whether a length of a connecting line extending between edges of an object cross-section and being parallel to a layer falls below a minimum dimension m specified in advance.

Figure 2:
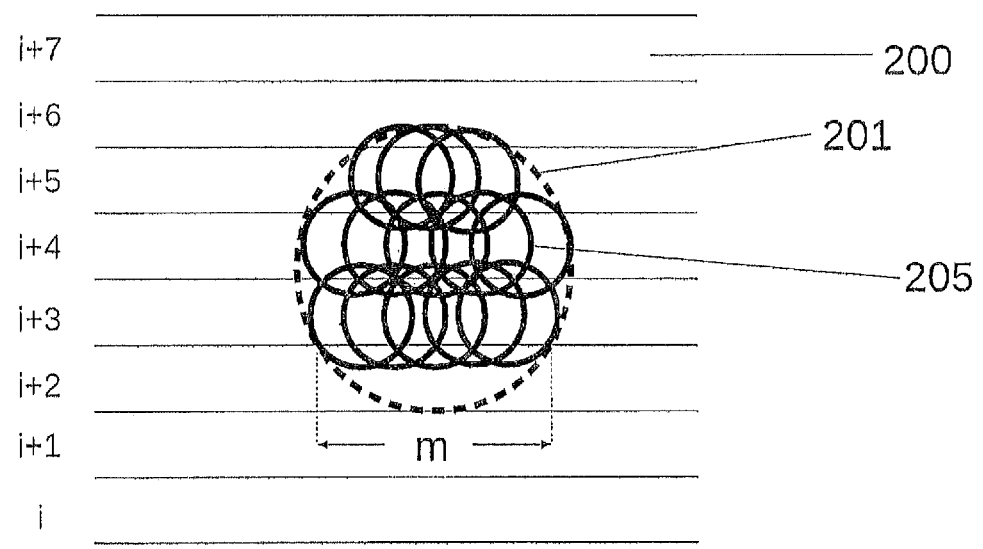

In FIG. 2, layers 200 of the building material are depicted as an illustration. The dashed circle 201 represents the contour of a cylinder section of the object to be manufactured extending perpendicularly to the image plane. Further, the minimum dimension m can be seen in FIG. 2. The position of the cylinder cross-section with respect to the building material layers is defined in the first data set. There, it is thus, for instance, recorded for each of layers i+3 to i+5 where within the respective layer a solidification by means of the laser beam shall take place. For solidifying the building material exactly within the contour 201, the laser radiation has to be directed to the corresponding positions of the respective layers. In FIG. 2, this is schematically shown by plotting circular melt pool diameters that illustrate the melt pool of melted building material generated in a layer by directing the laser beam to a position in this layer.

As one can see in FIG. 2, the melt pool diameter 205 has an extension different from zero. Thus, when the laser beam (and, with it, the melt pool diameter) is moved over all positions to be solidified within the contour 201, it is difficult to correctly reproduce the circular contour by a movement of the melt pool diameter 205, even if the laser beam is not directed to regions close to the contour, i.e. the beam is always displaced with respect to the contour by a predetermined absolute value, the so-called "beam offset", towards the inside of the object cross-section.

Now, according to the invention it is specified that no solidification at all is effected in the layer i+2 by the laser beam since the extension of the region to be solidified within the contour 201 falls below the minimum dimension m in this layer. (In the layer i+5, the minimum dimension is not yet undercut.)

According to the invention, a second data set which is identical to the first data set and in which, however, the corresponding positions in the layer i+2 are marked as positions not to be solidified is generated. The control command set used in the generative layer manufacturing method for manufacturing the cylinder section is generated on the basis of this second data set.

Figure 4A:
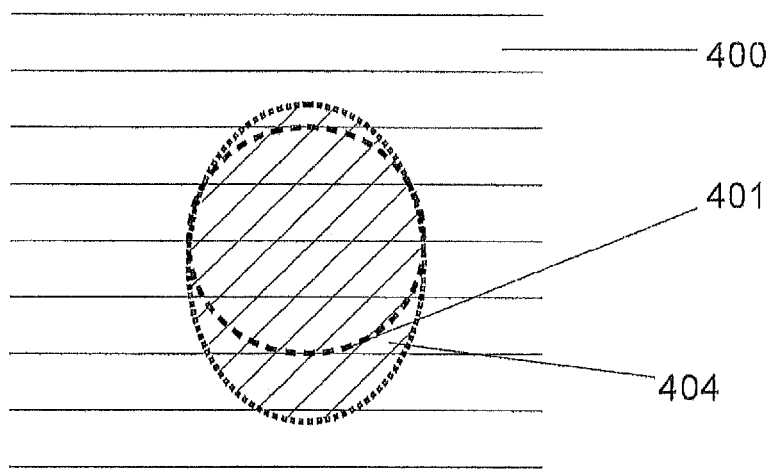
Figure 4B:
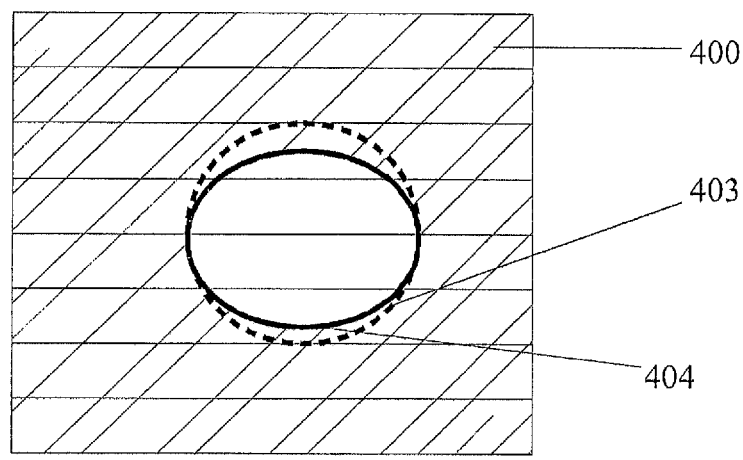

The non-solidified powder existing below the layer i+3 and having a poor heat dissipation capability will partially melt in spite of the omitted irradiation, so that, in spite of an omitted heat supply to the layer i+2 by the laser radiation, the material in the layer i+2 is nevertheless melted in such a manner that the solidified region approximately reproduces the circular contour 201. Here, it should be noted that a hatching of the solidified region (as in FIGS. 4a and 4b) was dispensed with in FIG. 2 for the sake of clarity.

Figure 3:
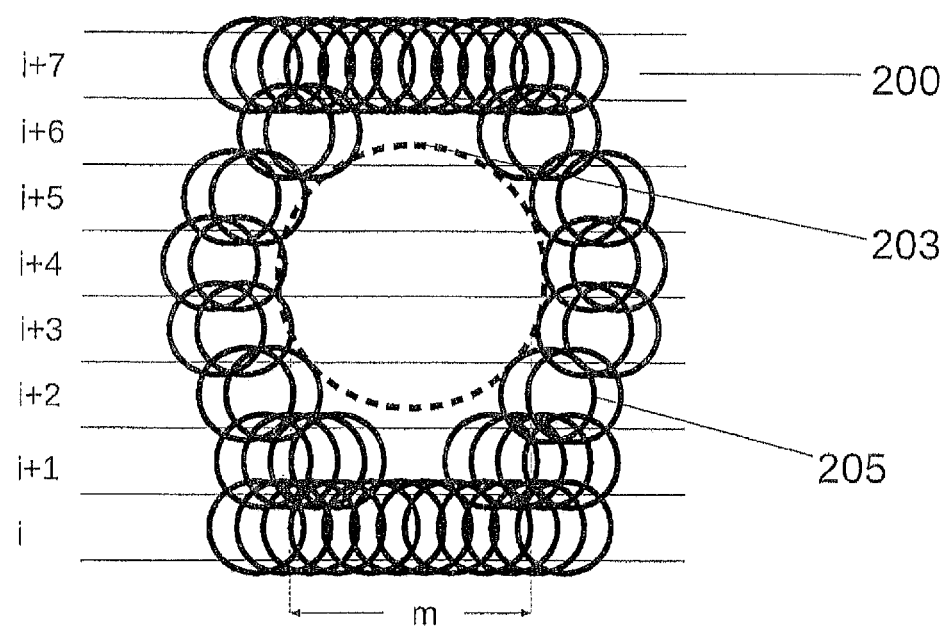

FIG. 3 shows, as a further example, the case of a manufacturing of an object comprising a channel which is parallel to the building material layers and has a circular cross-section. In FIG. 3, again, the building material layers i to i+7 are designated by the reference sign 200. The contour 203 of the circular cross-section lies in layers i+2 to i+6. The melt pool diameter that results in a powder layer from directing the laser beam onto the build area 8 is designated by reference sign 205. Although this is not indicated by means of hatching in FIG. 3, all positions of the layers i to i+7 lying outside of the contour 203 shall be solidified. For instance, the melt pool diameters bordering on the contour 203 on the left and on the right in the layer i+4 shall be representative of a plurality of melt pool diameters that solidify all positions of the layer i+4 shown in FIG. 3 outside of the contour 203. It should be noted that a solidification of building material is carried out by supplying heat to the building material by the irradiation, so that the latter partially or completely melts at the irradiated position, whereby a melt pool is generated. The actual solidification takes place when the melt pool cools down again after the melting, whereby an interconnection of the powder particles is effected at the melted positions, so that a solid body exists after the cooling down.

According to the invention, in the method according to the invention illustrated by means of FIG. 3, it is, as in the method according to FIG. 2, determined on the basis of a first data set whether, in the respective layers, a length of a connecting line extending between edges of an object cross-section and being parallel to the layer falls below a minimum dimension m. Thus, in the method according to FIG. 3 it is determined whether the extent of the circle confined by the contour 203 in a horizontal direction falls below the minimum dimension m. In the example of FIG. 3, an undercut of the minimum dimension is determined for layers i+5 and i+2. Theoretically, one could, indeed, determine an undercut of the minimum dimension also for the layer i+6. However, in the example of FIG. 3, the contour 203 does not even extend up to half the layer thickness of the layer i+6. Therefore, it was assumed in this example that the layer i+6 is to be considered as a layer not to be solidified.

Now, according to the invention, the procedure for all layers, for which an undercut of the minimum dimension m occurs, is as follows:

For all layer positions, at which an undercut of the minimum dimension occurs, no solidification is carried out at the adjacent positions existing in the layer lying directly below or above. One can see this in FIG. 3, for instance, at the layer i+1 and the layer i+7.

Although in layers i+1 and i+7 no solidification is performed at some positions, the contour 203 can nevertheless be realized with an approximately circular shape since the non-solidified building material existing at the corresponding positions in the layers i+1 and i+7 has a poor heat dissipation capability, so that the building material is melted at these positions.

Although the method according to the invention has been described on the basis of a circular cylinder to be solidified or, respectively, a circular channel within an object, the method is, of course, applicable to arbitrary object shapes. As further examples for object sections which can be realized true to detail, the following examples shall be mentioned without meaning a limitation:

Both the cylinder having contour 201 in FIG. 2 and the channel having contour 203 in FIG. 3 do not necessarily have to extend in parallel to the layers 200. It is just as well possible to achieve improvements in the detail resolution when the cylinder section (for instance, a section of a lattice bar) or the channel extend aslant to the layers, i.e. form an angle to the layers. Here, the angle to the horizontal layer extension can be any angle between 0° and 90°, for instance, 5°, 10°, 20°, 30°, etc. Further, both the cylinder and the channel can change the direction along their extension, i.e., for instance, can meander through the available space or, for instance, can helically wind through the available space. Further, the cylinder or the channel may certainly also have a different diameter at different positions.

With the procedure according to the invention, in particular, also the realization of internal threads or external threads is possible true to detail without a rethreading being still necessary after the manufacturing process by means of a generative layer manufacturing process.

Particularly high requirements at detail accuracy also arise in the case of narrowing tips (generally in the case of tapers, i.e. narrowing sections) and narrowing blind holes. In the case of such object details, the procedure can be the same as it was described on the basis of FIG. 2 or, respectively, FIG. 3.

Further, a three-dimensional object to be manufactured can also have "bottlenecks" where different sections of the object come so close to each other that only a very small interspace remains. Such a case has to be considered as similar to a channel having a small cross-section, so that the procedure can be similar to the one in FIG. 3.

Advantageously, the value of the minimum dimension m is specified depending on the thermal conductivity of the building material used. The greater the thermal conductivity, the better heat is transported away from the irradiated position, so that less building material adjacent to the irradiated position, which building material shall actually not be solidified, is melted. The inventors have found out that the melt pool diameter generated by the radiation can be a good guidance value for the minimum dimension m to be selected. The farther a melt pool diameter extends into other building material layers, the greater is the effect on building material that shall actually not be solidified and the greater should also be the minimum dimension that is selected. If the melt pool diameter is large in comparison to the layer thickness, when realizing hollow spaces, such as e.g. channels, it may possibly be necessary to exclude from the irradiation not only adjacent positions in the layer lying directly above or below, but also positions in the "next but one" layer etc.

A representative melt pool diameter to be expected can, if it is not an experience value, be empirically determined, on the one hand, by pre-tests before a manufacturing process and, on the other hand, by an ongoing monitoring of the melt pool diameter during a manufacturing process of objects. A generative layer manufacturing device according to the invention in which the method according to the invention is carried out preferably contains a melt pool monitoring unit 39 which is able of providing sensory, for instance optical, information about a melt pool at a point of incidence of the radiation used for solidifying the building material on a powder layer. The melt pool monitoring unit 39 is, for instance, a sensor which can be directed to an irradiated position and capture and process the electromagnetic radiation (visible light and/or infrared radiation) emitted by the melt pool. For instance, an image of the melt pool can be recorded, on the basis of which a melt pool diameter is determined. The melt pool diameter is preferably determined at a reference position at which a similar melt pool diameter is to be expected as at the positions at which filigree object sections shall be realized. Here, the melt pool diameter is dependent on the material and on the heat introduced into the material per unit area. Typically, the melt pool diameter is about 80 to 300 µm.

At this point it shall be emphasized that the circular (or, respectively, spherical) representation of the melt pool in the figures is merely schematic. In fact, the shape of the melt pool will deviate from the spherical shape. Further, the shape of the melt pool can also vary within a building material layer depending on the degree by which non-solidified building material exists in the surrounding area of the respective position. For this reason, it is mentioned further above that the melt pool diameter is determined at a reference position that is considered to be representative. It has been shown that by using such a representative reference position and by assuming a representative melt pool to be spherical, the minimum dimension m to be used can be specified with a good accuracy.

Even though a "beam diameter" was often referred to so far, the invention is also applicable to generative layer manufacturing devices in which the electromagnetic radiation is introduced not in the form of a "beam", but in an areal or, respectively, linear manner. Correspondingly, the melt pool diameter has an areal or, respectively, linear shape.

In a modification of the invention, the three-dimensional computer-based model of an object to be manufactured is stretched by a predetermined percentage in z direction (i.e. in a direction perpendicular to the layers) prior to a slicing into layers. If then, according to the method according to the invention, several positions are not irradiated and thereby, for instance, a round rod extending parallel to the layers is flattened too much, this flattening is compensated by the preceding stretching in z direction.

In a further modification of the procedure according to the invention, an irradiation at the corresponding positions defined above is not dispensed with when the minimum dimension is undercut. Rather, a reduced amount of thermal energy is supplied at the corresponding positions defined above (i.e. positions within an object cross-section on a connecting line between its edges or positions in a layer directly above or below the layer in which an undercut of the minimum dimension has been detected when the minimum dimension has been detected outside of an object cross-section) than at the other positions to be solidified. In other words, for instance, only 80% of the amount of thermal energy supplied to the other positions within the object cross-section is supplied to the mentioned positions, however, possible are also other percentages, such as e.g. 20%, 30%, 40%, 50%, 60%, 70%, 90%, etc.

Although it has been mentioned further above that, according to the invention, in the case of an undercut of a minimum dimension, an irradiation in the layer lying directly below or above is omitted at the adjacent positions or a reduced thermal energy amount is introduced at these positions, in a modification of the invention, the irradiation can be omitted or, respectively, reduced additionally also in further layers (for instance, the next but one layer lying above or below). It depends, for instance, on the thermal conductivity of the non-solidified building material whether such a procedure is reasonable.

Additionally to the procedure according to the invention, also further measures can be met that lead to a dimension of a solidified object section in a powder layer that is as small as possible. For instance, the region of incidence of the radiation can be offset to the inside with respect to the edge of an object cross-section to be solidified, so that only the edge of the region of incidence and not its center touches or, respectively, crosses the edge of the object cross-section. Furthermore, sections of an object cross-section having a very small diameter parallel to the building material layer can also be solidified by a "point irradiation" where the procedure is as follows:

For solidifying a section of the object cross-section, the radiation is directed only to a single position within this section. A melt pool is then formed whose dimensions specify the minimal possible diameter of a section of the object cross-section to be solidified. Even though the diameter of the section of the object cross-section to be solidified is greater than this minimum diameter, the section can nevertheless be solidified by solidifying only a single position within the section of the object cross-section. To this end, the time that the irradiation spot rests on the single position within the section is merely enlarged. Due to the longer interaction period of the radiation at one and the same position, a melt pool having an enlarged diameter results.

The present invention can, in particular, be advantageously applied to the manufacturing of objects comprising filigree sections. Here, a filigree section in the sense of the invention is, in particular, a section of the object whose extension in z direction (i.e. perpendicularly to the layers) is less than ten times the layer thickness, preferably 4 to 6 times the layer thickness.

Even though the invention has always been described in connection with laser sintering or melting devices so far, the invention can nevertheless be applied in the same manner also in connection with generative layer manufacturing methods where a different radiation source than a laser is used for introducing the radiation for the solidification (for instance, a panel radiator, but also a particle radiation source). However, as already mentioned further above, also an application in connection with other generative layer manufacturing methods is possible where a shapeless, building material i.e. one in powder form or a liquid is used, e.g. in 3D printing methods, but also in stereolithography methods. Also in these methods, a manufacturing process is controlled in a corresponding generative layer manufacturing device by a control command set specifying, for each of several layers to be selectively solidified, the positions to be solidified. Also in these methods, the inventive provision of the control command set leads to a manufacturing of filigree objects with a good detail resolution.

Thus, all variations and modifications of the invention described are not limited to the respectively explicitly mentioned generative layer manufacturing method or, respectively, the corresponding device, but can also be employed in all other mentioned generative layer manufacturing devices and methods where a shapeless building material is processed.

The invention claimed is:

1. A method of providing a control command set for manufacturing at least one three-dimensional object by a generative layer manufacturing device, wherein the at least one object is manufactured in the generative layer manufacturing device layer by layer by solidifying a building material at positions corresponding to a cross-section of an object in a layer by supplying energy radiation or a binding agent to the positions corresponding to the cross-section, wherein the method comprises the following steps:
providing a first data set that marks the positions corresponding to the cross-section for each of a plurality of building material layers to be selectively solidified during a generative layer manufacturing process, wherein the building material layers lie directly above one another;
determining whether, in a layer, a length of a connecting line extending between edges of one or more object cross-sections and being parallel to the layer is less than a predetermined minimum dimension; and
generating a second data set that is different from the first data set in that,
when the step of determining determines that the length of the connecting line is less than the predetermined minimum dimension for the layer, marking a layer position lying within the object cross-section on the connecting line as a position not to be solidified or as a position to which a reduced radiation energy amount or a reduced binding agent amount is to be supplied in comparison to other positions in the layer, and/or for a layer position lying outside of the object cross-section on the connecting line, marking positions of an object cross-section in a layer directly above and/or a layer directly below that are adjacent to the layer position lying outside of the object cross-section on the connecting line as positions not to be solidified or as positions to which a reduced radiation energy amount or a reduced binding agent amount is to be supplied; and,
integrating the second data set into the control command set.

2. The method according to claim 1, wherein the solidification of the building material is accomplished by heat supply to the positions corresponding to the cross-section of the object in the layer by selectively scanning the layer with energy radiation.

3. The method according to claim 1, wherein the predetermined minimum dimension is specified depending on a thickness of the layer.

4. The method according to claim 1, wherein for the layer position lying outside of the object cross-section on the connecting line, in n further layers adjacent to the layer directly above or to the layer directly below, positions lying above or below the layer position are marked as the positions not to be solidified or as the positions to which the reduced radiation energy amount or the reduced binding agent amount is to be supplied, wherein n is an integer less than 10.

5. The method according to claim 1, wherein the at least one object comprises a three-dimensional region in which a three-dimensional lattice of lattice bars is present, wherein at least in one layer within at least one of the lattice bars it is determined whether the length of the connecting line extending between the edges of one or more of the object cross-sections and being parallel to the layer is less than the predetermined minimum dimension and, if this is the case in the layer, marking all positions lying in the layer within the cross-section through the lattice bar on the connecting line between the edges of the cross-section whose length undercuts the minimum dimension as the positions not to be solidified.

6. The method according to claim 1, wherein the at least one object comprises a channel extending not perpendicularly to the layers, wherein at least in one layer within the channel it is determined whether the length of the connecting line extending between the edges of one or more of the object cross-sections and being parallel to the layer is less than the predetermined minimum dimension and, if this is the case in the layer, for all positions lying in the layer within the channel on a connecting line between the edges of the channel in the layer whose length undercuts the minimum dimension, marking the positions of the object cross-section in the layer directly above and/or below adjacent to the positions as positions not to be solidified.

7. The method according to claim 1, wherein the at least one object comprises at least one taper protruding upwards or downwards at an angle less than 30° to the perpendicular to the layers,
wherein at least in one layer it is determined within the taper whether the length of the connecting line extending between the edges of one or more of the object cross-sections and being parallel to the layer is less than the predetermined minimum dimension and, if this is the case in the layer, marking all positions lying in the layer within the cross-section through the taper on the connecting line between the edges of the taper whose length undercuts the minimum dimension as positions not to be solidified.

8. The method according to claim 1, wherein the at least one object comprises at least one blind hole protruding and narrowing upwards and/or downwards at an angle less than 30° to the perpendicular to the layers,
wherein at least in one layer within the blind hole it is determined whether the length of the connecting line extending between the edges of one or more of the object cross-sections and being parallel to the layer is less than the predetermined minimum dimension and, if this is the case in the layer, for all positions lying in the layer within the cross-section through the blind hole on a connecting line between the edges of the blind hole whose length undercuts the minimum dimension, marking positions of the object cross-section in the layer directly above and/or below adjacent to thee positions as positions not to be solidified.

9. The method according to claim 1, wherein the minimum dimension is specified depending on an expected maximum extension parallel to a powder layer of a melt pool to be generated by the energy radiation.

10. The method according to claim 1, wherein for the positions of the object cross-section in the layer at which the solidification is intended in the layer lying directly below or above, specifying the supply of the radiation energy amount or the binding agent amount that is less than for the other positions to be solidified in the layer.

11. A method of manufacturing at least one three-dimensional object by means of a generative layer manufacturing device controlled by a control command set generated by a method according to claim 1,
wherein the at least one object is manufactured in the generative layer manufacturing device layer by layer by solidifying a shapeless building material at the positions corresponding to the cross-section of an object in a layer by supplying energy radiation or a binding agent to these positions and the method at least comprises the following steps:
an application step of providing a layer of a shapeless building material on a building base or an already existing layer of the building material,
a solidification step of solidifying the applied layer during which the energy radiation or the binding agent interacts with positions of the layer to be solidified such that after the interaction the building material exists as a solid body,
wherein the application step and the solidification step are repeated one after another until all cross-sections of the at least one three-dimensional object to be manufactured are solidified.

12. A generative layer manufacturing device for manufacturing at least one three-dimensional object from a shapeless building material layer by layer by solidifying the building material at the positions corresponding to the cross-section of an object in a layer by supplying energy radiation or a binding agent to these positions, wherein the device comprises:
a building base for carrying the object to be built up,
an application device for applying a layer of the building material onto the surface of the building base or an already existing layer,
a solidification device emitting energy radiation or discharging a binding agent and being capable of supplying the energy radiation or the binding agent to all positions to be solidified in a layer such that the building material at these positions exists as a solid body after being affected by the energy radiation or the binding agent, and
a control device controlling the application device and the solidification device such that an application step and a solidification step are repeated one after another until all cross-sections of the at least one three-dimensional object to be manufactured are solidified,
wherein the control device is configured such that it performs a method according to claim 1.

13. The generative layer manufacturing device according to claim 12, in which
a building material in powder form can be used and the solidification device is an irradiation device emitting electromagnetic radiation or particle radiation, wherein the irradiation device is capable of irradiating all positions to be solidified in a layer such that the powder grains at these positions are partially or completely melted by the heat energy supplied by the radiation, so that, after a cooling down, they are interconnected forming a solid body and
additionally, a melt pool monitoring unit is provided which is able of providing sensory, in particular optical, information about a melt pool at a point of incidence of the radiation of the irradiation device onto a layer of the building material in powder form, wherein the generative layer manufacturing device is configured to use a sensory information about the melt pool by the control device for specifying the minimum dimension.

14. A control device for equipping and/or retrofitting a generative layer manufacturing device,
wherein the control device is configured such that it performs a method according to claim 1.

15. A computer program loadable into a programmable control device and/or data processing device and having program code means in order to perform all steps of a method according to claim 1 when the computer program is executed in the control device and/or the data processing device.

* * * * *